(12) United States Patent
Keegan

(10) Patent No.: US 8,430,214 B2
(45) Date of Patent: *Apr. 30, 2013

(54) HAND CONTROLLED STOPPING DEVICE FOR A CAMERA DOLLY

(76) Inventor: Douglas Keegan, Glendale, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 13/088,280

(22) Filed: Apr. 15, 2011

(65) Prior Publication Data

US 2011/0192685 A1 Aug. 11, 2011

Related U.S. Application Data

(63) Continuation of application No. 12/559,440, filed on Sep. 14, 2009, now Pat. No. 7,926,623, which is a continuation of application No. 11/216,291, filed on Aug. 31, 2005, now Pat. No. 7,607,519.

(51) Int. Cl.
*B60T 1/06* (2006.01)

(52) U.S. Cl.
USPC .............................................. 188/17; 254/8 B

(58) Field of Classification Search .................... 188/41, 188/43, 44, 56, 2 D
See application file for complete search history.

(56) References Cited

U.S. PATENT DOCUMENTS

| | | | |
|---|---|---|---|
| 1,379,548 A | 5/1921 | Gaillard | |
| 2,224,901 A | 12/1940 | Cunningham | |
| 3,951,426 A | 4/1976 | Shaffer et al. | |
| 4,566,391 A | 1/1986 | Haberl et al. | |
| 5,609,108 A | 3/1997 | Chapman | |
| 6,155,176 A | 12/2000 | Checketts | |
| 6,227,336 B1 | 5/2001 | Rudy | |
| 6,272,914 B1 | 8/2001 | Ciotti | |
| 6,336,528 B1 | 1/2002 | Rudy | |
| 6,478,427 B1 | 11/2002 | Morris et al. | |
| 6,517,207 B2 | 2/2003 | Chapman | |
| 6,579,016 B2 | 6/2003 | Chapman | |
| 6,626,117 B1 | 9/2003 | Chapman | |
| 7,029,214 B2 | 4/2006 | Shiba et al. | |
| 2002/0005322 A1 | 1/2002 | Tremblay et al. | |
| 2004/0224821 A1 | 11/2004 | Hausner et al. | |
| 2005/0274278 A1 | 12/2005 | Thieltges | |

FOREIGN PATENT DOCUMENTS

GB 2077866 A 12/1981

*Primary Examiner* — Robert A Siconolfi
*Assistant Examiner* — James Hsiao
(74) *Attorney, Agent, or Firm* — Venable LLP; Stefan J. Kirchanski

(57) ABSTRACT

A braking system allows for smooth and accurate stopping of a camera dolly operating on tracks. A pair of caliper brake modules attached to the dolly frame are sized so that they fit over and at least partially surrounds the track. When the caliper brakes are activated, brake pads are moved towards the surrounded track squeezing it and providing a significant braking force. This permits the dolly to be smoothly brought to a stop with no possibility of the dolly wheel locking and skidding. The braking system can be temporarily attached to the dolly by a removable fastener system, or it can be permanently built into the dolly. A master hydraulic cylinder with a conveniently placed actuating lever is connected to the brake caliper modules by hydraulic lines so that slave hydraulic cylinders can apply the brakes in response to the actuating lever.

14 Claims, 2 Drawing Sheets

HAND CONTROLLED STOPPING DEVICE FOR A CAMERA DOLLY

The present application is a Continuation application of and claims priority from U.S. application Ser. No. 12/559,440, filed on Sep. 14, 2009 (now U.S. Pat. No. 7,926,623), which is a Continuation application of and claims priority from U.S. application Ser. No. 11/216,291, filed on Aug. 31, 2005 (now U.S. Pat. No. 7,607,519), which the instant application also claims the benefit of and priority from, wherein each of the aforementioned applications is incorporated herein by reference in its entirety.

BACKGROUND OF THE INVENTION

1. Area of the Art

The field of the invention involves dollies which are small trucks used to move motion picture cameras and more specifically a braking system to allow careful control of dolly motion.

2. Description of Related Art

In filming televisions or motion pictures it is frequently necessary to move the camera—often while filming is taking place. For example, the camera may be moved forwards towards the actors to transition from a distant view to a more close-up view. To achieve this movement the camera, the camera man and the assistant camera man ("focus puller") ride on the dolly which is usually pulled or pushed by dolly operators or "dolly grips." When the dolly is used on a smooth surface, it can be used with pneumatic wheels. When the surface is uneven or where special precision of motion is required, special tracks are put down for the dolly to run on.

Often the film director determines a precise mark on which the moving dolly is supposed to stop. Considering that a dolly with camera, camera man and focus puller can easily weigh in excess of 700 pounds, it is easy to imagine that smoothly stopping the dolly on the mark—particularly when running on low friction tracks—can be extremely difficult. It may be necessary to use multiple dolly grips to bring the dolly to rest.

There has been a tremendous amount of development and improvement of dolly design. Great attention has been paid to various lift beams and booms to alter camera elevation. For examples see U.S. Pat. No. 6,478,427 to Morris et al., U.S. Pat. No. 6,517,207 to Chapman and U.S. Pat. No. 6,579,016 to Chapman. In addition much attention has been paid to various steering mechanisms. When the dolly runs on pneumatic tires, it must be steered like any car or truck. When it runs on a track, the track takes care of steering. Similarly, great attention has been paid to various wheel conversion systems that allow a simple switch-over from pneumatic tires to tracks. For examples see U.S. Pat. No. 4,566,391 to Haberl et al which discloses a wheel system that switches from tires to track wheels and illustrates a steering device for the tires, and U.S. Pat. No. 5,609,108 to Chapman which illustrates a different system for converting between track wheels and tires.

Dolly tracks are either square (like rail road tracks) or round in cross-section. With a square track it is possible to operate the dolly with pneumatic tires running on the upper surfaces of the tracks (guidance wheels run along the inward-facing track surfaces to prevent the dolly from falling off the tracks. With a round track special track-wheels having a wheel groove (round in cross-section) are often used to keep the dolly on the track. More recently, the grooved wheels has been replaced by pairs of skateboard wheels with the axel of one wheel perpendicular to the second wheel so the wheels contact the track simultaneously, one wheel contacting the track's inward-facing surface and the other wheel contacting the track's outward-facing surface. The flat skateboard wheels have minimal areas of contact with the track so that friction is greatly reduced.

The prior art has not addressed the problem of bringing a moving dolly to a smooth and precise stop on a track. Some prior art dollies include braking systems for use with a pneumatic tire configuration. Most of the braking systems are intended only as a "wheel locks" or parking brakes to prevent inadvertent movement of the dolly when it is at rest. A precisely controllable brake for use with dollies operating on tracks.

SUMMARY OF THE INVENTION

An improved braking system allows for smooth and accurate stopping of a camera dolly that is operating on tracks. The braking system does not operate by applying a braking force to the wheels of the dolly. Rather a caliper brake module attached to the dolly frame or to a skateboard wheel frame that carries the entire dolly. The caliper brake is sized so that it fits over and at least partially surrounds the track. When the caliper brake is not activated, the caliper simply slides over the track when the dolly moves. When the caliper brake is activated, one or more brake pads are moved towards the gripped track squeezing it and providing a significant braking force directly to the track. Because the brake module is attached either to the dolly or to the frame on which the dolly rides, motion of the dolly is rapidly and efficiently controlled. This permits the dolly to be smoothly brought to a stop exactly at a predetermined location. By applying the braking force directly to the track, there is no possibility of the dolly wheel locking and skidding as may happen when the braking force is applied to the dolly wheel(s).

In a preferred embodiment at least two of the caliper modules are provided—one for the left side of the dolly and one for the right side. The caliper modules can be independent or can be attached to a subassembly so that both modules can be moved and attached to the dolly simultaneously. The caliper modules or subassembly can be temporarily attached to the dolly or skate wheel frame by a removable fastener system such as a nut and bolt combination. This way the calipers are attached only when the dolly is put on tracks. This permits one set of brakes to be used on more than one dolly. Alternatively, the braking system can be permanently built into the dolly (or skateboard wheel frame). When the caliper brake modules are permanently built into a dolly, they can be advantageously equipped with a flexible or reconfigurable mounting system so that the calipers can be moved out of the way when not in use.

In a preferred embodiment the caliper brakes are hydraulically activated. A master hydraulic cylinder with an actuating lever is connected to the brake caliper modules by hydraulic lines. Slave hydraulic cylinders within the braking modules respond to the master cylinder and apply the brakes. The master cylinder is mounted on the dolly or skate wheel frame in position to be manipulated by a camera man, a focus puller or grip or another member of the crew. The exact placement of the cylinder and actuating lever depends on which crew member is responsible for the braking task. Flexible hydraulic lines can be use so that the actuating lever can be readily relocated.

Alternate methods of activating the caliper brakes can be used. The activation can be pneumatic or mechanical (generally by means of a cable). Activation can even be electrical with an electrical signal generated in response to a movement of the actuating lever causing motion of a stepper motor or similar electromechanical device which then applies force to the brake pads.

DETAILED DESCRIPTION OF THE INVENTION

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved braking system for camera dollies operating on tracks.

Prior art dolly brakes are intended to operate on the main pneumatic wheels. These brakes are primarily intended as "parking brakes" for maintaining the dolly at rest. Such brakes are not designed to bring a moving dolly to a smooth stop. Existing braking systems operate directly through the wheels of the dolly—not unlike brakes in motor vehicles. In many instances dollies are used on tracks to ensure smooth motion. Although some dollies have grooved wheels or other similar arrangements to run on the track, the most popular means for operating dollies on tracks employs skateboard wheels. Conventional braking systems are not at all operational with skateboard wheels. Even where a braking system acts on grooved wheels, a smooth stop is generally not possible because the wheels can slip on the track. The present invention overcomes this problem by utilizing a caliper brake system that applies it braking force directly to the track rather than to the wheels.

Figure 1:
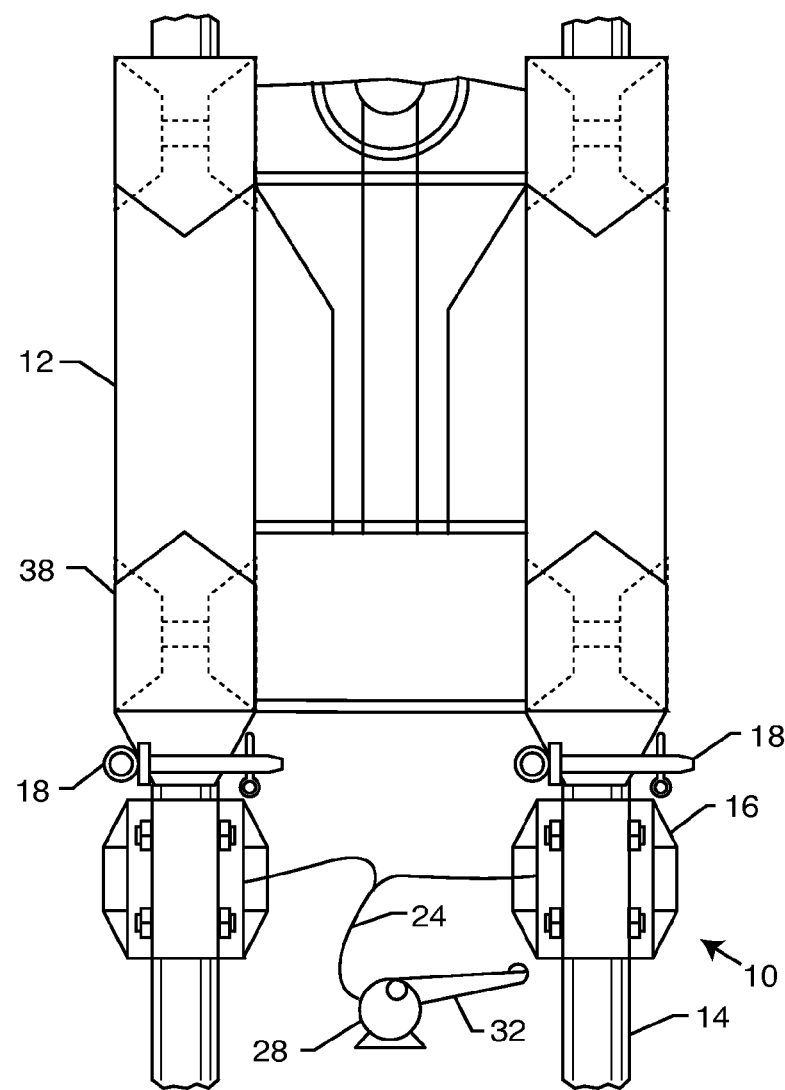
FIG. 1 shows the present invention in use with a conventional dolly having grooved wheels operating on a round cross-section track.
Figure 2:
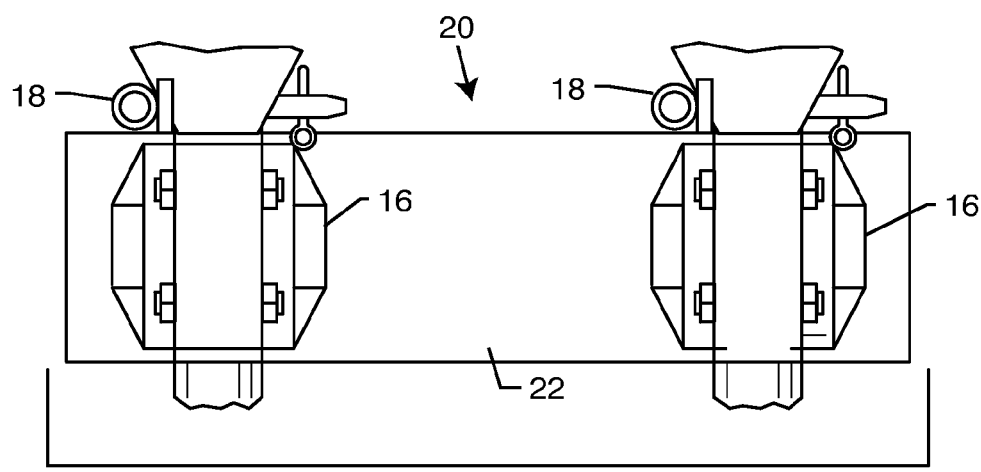
FIG. 2 shows a subassembly including two caliper brake modules in relation to the tracks.

FIG. 1 shows a diagram of the present invention 10 attached to a conventional dolly 12 operating on by means of grooved wheels 38 on round cross-section track 14. The caliper system 10 can be readily constructed to work on a square track, and the invention is equally applicable to tracks of either type. In one common system the dolly platform is square or rectangular and has a wheel at each corner. For track operation the wheel has a rounded groove so that the wheel rides on and essentially surrounds the track. In this embodiment the inventive brake system preferably consists of two caliper modules 16, one for the right side and one for the left side of the of the dolly. Of course, it is possible to have a brake on only one of the two tracks. In the illustrated embodiment the caliper assemblies are separate units, and each unit can be removably attached to the dolly by mechanical fasteners 18 such as a nut and bolt, shaft and cotter pin, hook, dovetail or the like. FIG. 2 shows an alternate embodiment 20 that joins the caliper modules 16 by attaching them to a separate brake sub-assembly 22 (generally a simple frame or platform) so that this unit containing two calipers can be readily attached or removed from the dolly 12.

The calipers are preferably operated hydraulically. Each caliper module 16 has at least one slave hydraulic cylinder 26 that is connected by hydraulic lines 24 to a master hydraulic cylinder 28. The master cylinder 28 includes an actuating or operation lever 32 so that an operator can activate the caliper modules 16 by moving the operation lever 32. The degree of activation is proportional to the movement of the lever so that the operator has a great deal of control over the brakes. When the brake caliper modules 16 are activated, the piston of the slave hydraulic cylinder 26 forces one or more brake pads into contact with the track 14, thereby greatly increasing the amount of friction and bringing the dolly to a smooth and controlled stop. In the figure the master cylinder 28 and the operation lever 32 are diagrammatically shown unrelated to their actual positions in a working device. In actual use they can be mounted on the dolly 12 for operation by the camera man or the focus puller. Alternatively, the master cylinder 28 can be mounted in a position that allows the dolly grip to manipulate the braking system.

Figure 3:
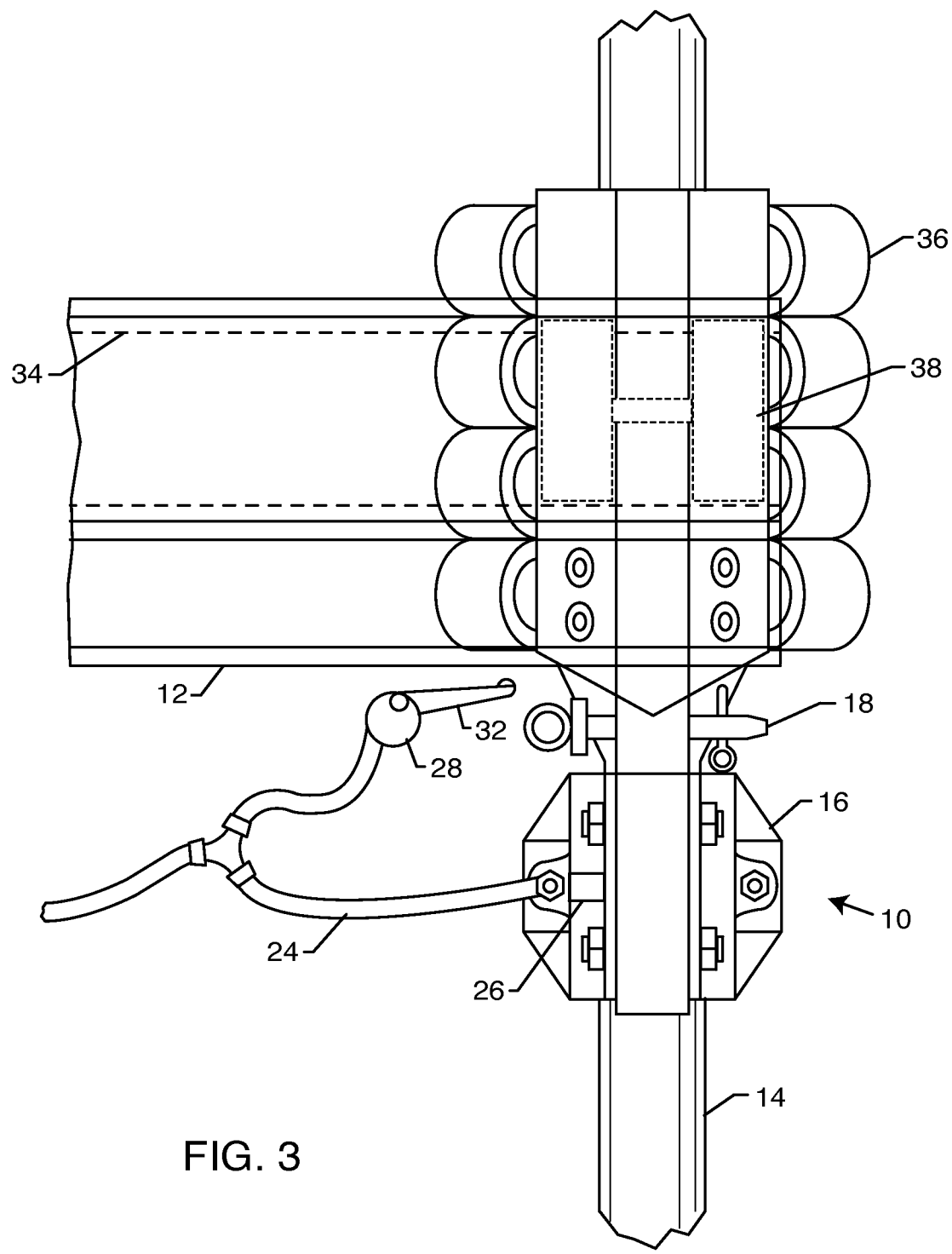
FIG. 3 shows the present invention in use with a skateboard wheel frame operating on a round cross-section track.

In many cases the grooved wheels and/or the flat tires of the dolly are replaced with "skateboard" wheels 36 or as shown in FIG. 3, the entire dolly 12 (with its wheels 38) sits on a frame that carries the skateboard wheels. FIG. 3 shows a skateboard wheel frame 34 on which the entire dolly 12 sits. The figure shows only the right side of the device and one of the two tracks 14. The skate board wheels 36 are angled towards the round track 14 to grip it and permit smoother motion than is generally possible with ordinary rubber dolly wheels. An advantage of the caliper brakes of the present invention is that they operate perfectly with either skateboard wheel frame or a regular dolly. Prior art brakes operate directly on the dolly wheels. When the dolly wheels are replaced with a skateboard wheel system, such brakes are completely ineffective. Where the ordinary dolly wheels 38 are replaced by skateboard wheels, the caliper brakes are attached to the dolly as explained above. Where the entire dolly rides on a skateboard wheel frame 34, the caliper braking system is attached to the frame rather than to the dolly.

The caliper system has been described as an add-on system that can be readily attached to a preexisting dolly to add track braking capability. It will be apparent to one of skill in the art that the caliper braking system can be built into any dolly. In that case it may be desirable to make the calipers repositionable so that they can be swung out of the way when the dolly is not used on tracks. Further, with a built-in braking system it is also possible to have more than one master braking cylinder or a repositionable master cylinder so that the brakes can be operated by different personnel at different times as need may be.

In addition, while hydraulic calipers are the preferred embodiment, the invention is adaptable to calipers employing alternative methods of activation. A brake system activated by cables (not unlike those of a bicycle) is perfectly useable as is a brake that is pneumatically activated. It is also possible to activate the caliper electronically with a stepper motor or servo-motor driving, for example, a lead screw that forces the brake pad into contact with the track. Electrical activation of the caliper brakes can be done with an actuator operationally connected to a control member. The control member can be manipulated by a user to cause activation of the actuator. The actuator comprises an electric control (e.g., the stepper motor, the servo-motor or similar electromechanical device). An electrical signal is generated in response to a movement of the activating lever 32 (i.e., the control member) causing motion of the electric control (i.e., the stepper motor, the servo-motor or similar electromechanical device) which then applies force to the brake pads via the lead screw. A mechanism for transmitting activation from the actuator to the caliper brake module (whereby the caliper module brakingly engages the track) comprises the lead screw and a conductor carrying the electric signal from the control member to the electric actuator which receives the electric signal. In all configurations of the present invention the brake can also be configured as a "safety" brake where a strong spring causes the brake pad to be constantly engaged with the track. In that case actuation consists of forcing the pad away from the track to allow motion of the dolly.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

| | |
|---|---|
| device | 10 |
| dolly | 12 |
| round track | 14 |
| caliper brake modules | 16 |
| mechanical fasteners | 18 |
| subassembly embodiment | 20 |
| subassembly platform | 22 |
| hydraulic lines | 24 |
| slave cylinder | 26 |
| master cylinder | 28 |
| actuating lever | 32 |
| skateboard wheel frame | 34 |
| skate wheels | 36 |
| dolly wheel | 38 |

I claim:

1. A braking system on a camera dolly riding on a pair of tracks, comprising:
    at least one caliper brake module connected to a camera dolly, the at least one caliper brake module sliding over a portion of at least one of the tracks and brakingly gripping the at least one of the tracks when activated, wherein first and second wheels of the dolly each run on a respective one of the tracks;
    means for placing the at least one caliper brake module in mechanical communication with the dolly;
    an actuator operationally connected to a control member which control member can be manipulated by a member of a dolly crew, when the dolly has a crew, to cause activation of the actuator, wherein the actuator is repositionable on the dolly to relocate the control member; and
    means for transmitting activation from the actuator to the caliper brake module whereby the caliper brake module brakingly grips the track.

2. The braking system according to claim 1 comprising two caliper brake modules.

3. The braking system according to claim 1, wherein the means for placing the at least one caliper brake module in mechanical communication with the dolly comprises a fastener selected from the group consisting of screws, nuts and bolts, rivets, welds, cotter pins, hooks and dovetails.

4. The braking system according to claim 1, wherein the at least one caliper brake module is directly in mechanical communication with the dolly when in use.

5. The braking system according to claim 1, wherein the actuator comprises a master hydraulic cylinder and the means for transmitting activation comprises a hydraulic line and a slave hydraulic cylinder.

6. The braking system according to claim 1, wherein the actuator comprises a hydraulic pump and the means for transmitting activation comprises a hydraulic line and a slave hydraulic cylinder.

7. The braking system according to claim 1, wherein the actuator comprises an electric control and the means for transmitting activation comprises a conductor and an electric actuator.

8. A braking system on a dolly riding on a pair of tracks, comprising:
    a pair of caliper brake modules connected to a dolly, the at least one caliper brake module, each module sliding over a portion of one of the tracks and brakingly gripping the track when activated, wherein first and second wheels of the dolly each run on a respective one of the tracks;
    means for placing the pair of caliper brake modules in mechanical communication with the dolly;
    a control member mechanically communicating with a master hydraulic cylinder which control member can be manipulated by a member of the dolly crew, when the dolly has a crew, to cause movement of a piston within the master hydraulic cylinder, and the master hydraulic cylinder is repositionable on the dolly to relocate the control member; and
    hydraulic lines transmitting movement of the piston within the master hydraulic cylinder to a slave hydraulic cylinder in mechanical communication with the caliper brake modules to cause the modules to become activated and brakingly grip the tracks.

9. The braking system according to claim 8, wherein the means for placing each caliper brake module in mechanical communication with the dolly comprises a fastener selected from the group consisting of screws, nuts and bolts, rivets, welds, cotter pins, hooks and dovetails.

10. The braking system according to claim 8, wherein the caliper brake modules are directly in mechanical communication with the dolly when in use.

11. The braking system according to claim 1, wherein a member of the dolly crew manually moves the dolly along the tracks.

12. The braking system according to claim 8, wherein a member of the dolly crew manually moves the dolly along the tracks.

13. The braking system according to claim 1, wherein the means for placing the at least one caliper brake module in mechanical communication with the dolly includes means for removing the at least one caliper brake module from mechanical communication with the dolly, allowing the at least one caliper brake module, transmitting means and actuator to be attached to/removed from the dolly as a unit.

14. The braking system according to claim 8, wherein the means for placing the pair of caliper brake modules in mechanical communication with the dolly includes means for removing the pair of caliper brake modules from mechanical communication with the dolly, allowing the pair of caliper brake modules, master hydraulic cylinder, hydraulic lines and at least one slave hydraulic cylinder to be attached to/removed from the dolly as a unit.

* * * * *